(12) United States Patent
Kotani et al.

(10) Patent No.: US 7,481,962 B2
(45) Date of Patent: Jan. 27, 2009

(54) METHOD OF MANUFACTURING CORDIERITE HONEYCOMB STRUCTURE INCLUDING MEASURING CLEAVAGE INDEX OF KAOLIN PARTICLES

(75) Inventors: Wataru Kotani, Nagoya (JP); Takehiko Watanabe, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 145 days.

(21) Appl. No.: 11/374,982

(22) Filed: Mar. 15, 2006

(65) Prior Publication Data

US 2006/0215814 A1 Sep. 28, 2006

(30) Foreign Application Priority Data

Mar. 24, 2005 (JP) ............... 2005-085273

(51) Int. Cl.
*B28B 21/52* (2006.01)
(52) U.S. Cl. .................................... 264/631
(58) Field of Classification Search .............. 264/631
See application file for complete search history.

(56) References Cited

U.S. PATENT DOCUMENTS 5,938,992 A * 8/1999 Hamanaka et al. ............ 264/43
6,004,501 A * 12/1999 Cornelius et al. ........... 264/631
6,048,490 A * 4/2000 Cornelius et al. ........... 264/631
6,210,626 B1 * 4/2001 Cornelius et al. ........... 264/631

FOREIGN PATENT DOCUMENTS

JP A 07-061892 3/1995
JP B2 2981107 11/1999

* cited by examiner

*Primary Examiner*—Carlos Lopez
*Assistant Examiner*—Russell J Kemmerle, III
(74) *Attorney, Agent, or Firm*—Oliff & Berridge, PLC

(57) ABSTRACT

There are newly provided an index which quantitatively indicates shapes of kaolin particles, and a method of measuring the index. There is also provided a method of manufacturing a low-thermal-expansion honeycomb structure suitable for an application such as a car exhaust gas purifying catalyst carrier by use of the kaolin particles whose index is not less than a predetermined value. A certain amount of kaolin particles 1 are pressed and filled into a container 2, peak intensities of the kaolin particles 1 in (200), (020), and (002) faces are measured by X-ray diffraction, respectively, and a cleavage index of the kaolin particles 1 is calculated from the resultant measured values by the following equation (1):

$$\text{Cleavage index} = (002)/[(200)+(020)+(002)] \quad \text{(Equation 1)},$$

wherein (200), (020), and (002) denote values of the peak intensities of the kaolin particles measured in the (200), (020), and (002) faces by the X-ray diffraction, respectively.

4 Claims, 2 Drawing Sheets

METHOD OF MANUFACTURING CORDIERITE HONEYCOMB STRUCTURE INCLUDING MEASURING CLEAVAGE INDEX OF KAOLIN PARTICLES

BACKGROUND OF THE INVENTION

1. Field of the Invention

The present invention relates to an index quantitatively indicating shapes of kaolin particles for use as a material for manufacturing a cordierite honeycomb structure or the like, a method of measuring the index, and a method of manufacturing a cordierite honeycomb structure which is suitable for an application such as a catalyst carrier for purifying an exhaust gas from a car and which has a low thermal expansion coefficient and an excellent resistance to thermal shock.

2. Description of the Related Art

Heretofore, a cordierite honeycomb structure has been broadly used as a catalyst carrier for purifying an exhaust gas from a car. The most important required characteristic of the honeycomb structure for use in such application is a resistance to thermal shock, and is largely influenced by a thermal expansion coefficient of the honeycomb structure itself. That is, to improve a thermal shock resistance of the cordierite honeycomb structure, it is important to lower the thermal expansion coefficient of the honeycomb structure as much as possible. As means for lowering the thermal expansion coefficient of the honeycomb structure, attempts are made to develop micro cracks along a c-axis direction of a cordierite crystal (see Japanese Patent Publication No. 7-61892) and to control an amount of an iron content existing in a cordierite forming material (see Japanese Patent No. 2981107).

The above-described means are effective for lowering the thermal expansion coefficient of the cordierite honeycomb structure, but in an industrial field, there are demands for further lowering of the thermal expansion coefficient and stabilizing of the low thermal expansion coefficient of the cordierite honeycomb structure in the present situations.

Additionally, it is known that the resistance to thermal shock of the cordierite honeycomb structure is largely influenced by the thermal expansion coefficient of the honeycomb structure in a longitudinal direction (axial direction of a cell) and that the resistance to thermal shock is hardly influenced by the thermal expansion coefficient in a diametric direction. It is also known that the thermal expansion coefficient of the cordierite crystal in the c-axis direction is lower than that in an a-axis direction. Therefore, when the cordierite crystals are oriented so as to bring the longitudinal direction of the honeycomb structure in parallel with the c-axis of the cordierite crystals, the thermal expansion coefficient in the longitudinal direction can be lowered, and the resistance to thermal shock can be improved.

The cordierite honeycomb structure is manufactured by: blending particles of talc, kaolin, alumina and the like so as to obtain a theoretical composition of cordierite; forming the resultant cordierite forming material into a clay to extrude the clay; and firing the resultant molded article. In the course of the firing, the cordierite crystals grow from the kaolin particles (crystal particles) as nuclei so as to cross the c-axis of the kaolin particles at right angles. In consequence, if the crystals can be oriented so that the c-axis of the kaolin particles cross the longitudinal direction of the molded article at right angles during the extrusion molding, the cordierite crystals can be oriented as described above.

The orientation of the kaolin particles during the extrusion molding is largely influenced by the shapes of the kaolin particles themselves. In a case where the kaolin particles become flat, when the particles pass through a slit of a die during the extrusion molding, the particles are easily oriented as described above. The layered kaolin particles become flatter owing to delamination (interlayer peeling) as the number of the layers decreases. However, since there has not been a method of quantitatively measuring the shapes of the kaolin particles, it has been difficult to selectively use the kaolin particles having the above-described shapes suitable for lowering the thermal expansion coefficient as the material of the cordierite honeycomb structure.

SUMMARY OF THE INVENTION

The present invention has been developed in view of such conventional situations, and an object is to provide an inventive index which quantitatively indicates shapes of kaolin particles, an inventive method of measuring the index, and a method of manufacturing a honeycomb structure being suitable for an application such as a catalyst carrier for purifying an exhaust gas from a car and having a low thermal expansion coefficient by use of the kaolin particles having an index which is not less than a predetermined value.

According to the present invention, there is provided a method of measuring a cleavage index of kaolin particles, comprising the steps of: pressing and filling a certain amount of the kaolin particles into a container; measuring peak intensities of the kaolin particles in (200), (020), and (002) faces by X-ray diffraction; and calculating the cleavage index of the kaolin particles from the resultant measured values by the following equation (1):

Cleavage index=(002)/[(200)+(020)+(002)]   (Equation 1), wherein (200), (020), and (002) denote values of the peak intensities of the kaolin particles measured in the (200), (020), and (002) faces by the X-ray diffraction, respectively.

Moreover, according to the present invention, there is provided a method of manufacturing a cordierite honeycomb structure whose main component of a crystal phase is cordierite by use of a cordierite forming material including kaolin particles, wherein the kaolin particles having an cleavage index of 0.84 or more are used as the kaolin particles, the cleavage index being measured by the above-described cleavage index measuring method.

According to the method of measuring the cleavage index of the kaolin particles in the present invention, it is possible to quantitatively indicate the shapes of the kaolin particles for use as the material for manufacturing the cordierite honeycomb structure or the like. As a result, it can be easily judged whether or not the kaolin particles are suitable as the material for manufacturing the cordierite honeycomb structure or the like. According to the method of manufacturing the cordierite honeycomb structure of the present invention, it is possible to stably manufacture the honeycomb structure having the low thermal expansion coefficient suitably for an application such as a catalyst carrier for purifying an exhaust gas from a car by use of the kaolin particles whose cleavage index obtained by the cleavage index measuring method is not less than the predetermined value.

DESCRIPTION OF THE PREFERRED EMBODIMENT

In a method of measuring a cleavage index of kaolin particles of the present invention, a certain amount of the kaolin particles are pressed and filled into a container, and there are measured peak intensities of the kaolin particles in (200), (020), and (002) faces by X-ray diffraction (XRD), and the cleavage index of the kaolin particles are calculated from the resultant measured values by the following equation (1):

Cleavage index=[(002)/(200)+(020)+(002)]   (Equation 1), wherein (200), (020), and (002) denote values of the peak intensities of the kaolin particles measured in the (200), (020), and (002) faces by the X-ray diffraction, respectively.

The "cleavage index" obtained in the present invention has been newly created as an index which quantitatively indicates the shapes of the kaolin particles by the present inventor. When this value is large (close to 1), a degree of delamination (interlayer peeling) of the kaolin particles is large, and many flat kaolin particles exist.

Figure 1:
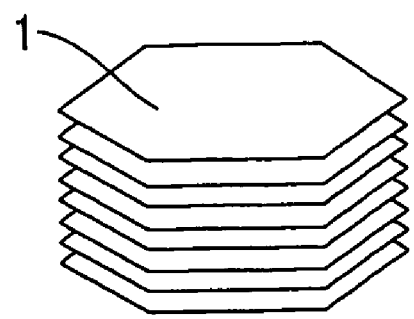
FIG. 1 is a schematic explanatory view schematically showing shapes of kaolin particles.

That is, as shown in FIG. 1, kaolin particles (crystal particles) 1 have a layered shape of hexagonal plates, and are cleaved in a (00Z) face of the shape. Therefore, when obtaining a ratio of a peak intensity of a (002) face occupying a total sum of peak intensities of (200), (020), and (002) faces, a degree of delamination is known, and a degree of presence of the flat kaolin particles can be quantitatively judged.

Therefore, by use of the cleavage index measuring method of the present invention, it can be easily judged beforehand whether or not the kaolin particles for use as a material for manufacturing, for example, a low-thermal-expansion cordierite honeycomb structure have a flat shape actually suitable for manufacturing the honeycomb structure.

Figure 2:
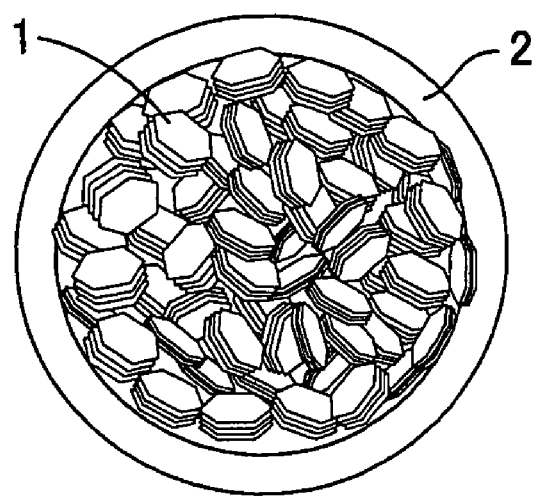
FIG. 2 is a schematic explanatory view schematically showing a state in which a certain amount of the kaolin particles are pressed and filled into a container (sample holder) in order to perform X-ray diffraction.

The measuring of the peak intensities of the (200), (020), and (002) faces required for the calculation of the cleavage index is performed by pressing and filling the certain amount of kaolin particles 1 into a container (sample holder) 2 as shown in FIG. 2, and performing the X-ray diffraction. Table 1 shows measurement conditions which are suitable for this X-ray diffraction. As an X-ray diffraction device, for example, RAD-1B (trade name) manufactured by Rigaku Corp. is preferably usable.

TABLE 1

| Measurement conditions of X-ray diffraction | |
|---|---|
| 1 Scanning speed (°/min) | 2 |
| 2 Scanning step (°) | 0.02 |
| 3 Scanning range (°) | 5-60 |
| 4 Scanning mode | continuous |
| 5 Voltage (kV) | 30 |
| 6 Current (mA) | 15 |
| 7 Target | Cu |
| 8 Receiving slit (mm) | 0.15 |
| 9 Scatter slit (deg) | 1 |
| ⑩ Divergence slit (deg) | 1 |
| ⑪ Sample folder spin | ON |
| ⑫ Sample press | YES |
| ⑬ Press pressure (T) | 1 |
| ⑭ Powder volume (g) | 2.3 |

TABLE 1-continued

| Measurement conditions of X-ray diffraction | |
|---|---|
| ⑮ Sample size (d × h) | Φ27 × 3 |
| ⑯ Aging before scanninng | ON |
| ⑰ Data process | |
| a. Leveling | 7 Point |
| b. Background | ON |
| c. Kα2-clearance | 0.5 |

A method of manufacturing a cordierite honeycomb structure in the present invention is a method of manufacturing a cordierite honeycomb structure whose main component of a crystal phase is cordierite by use of a cordierite forming material including kaolin particles. As the kaolin particles, there are used the kaolin particles whose cleavage index obtained by the cleavage index measuring method is 0.84 or more, preferably 0.93 or more, more preferably 0.96 or more. It is to be noted that the "cordierite forming material" mentioned herein means a substance to be converted into cordierite by firing, and examples of the material include a material constituted by mixing talc, kaolin, alumina, silica and the like so as to obtain a cordierite theoretical composition ($2MgO.2Al_2O_3.5SiO_2$) as a fired composition.

As to the kaolin particles whose cleavage index obtained by the cleavage index measuring method is 0.84 or more, most of the crystal particles have flat shapes. When such kaolin particles are used, it is possible to obtain a low-thermal-expansion cordierite honeycomb structure suitable for an application such as a car exhaust gas purifying catalyst carrier which requires a high resistance to thermal shock.

That is, as described above, in a case where the kaolin particles have the flat shapes, when the particles pass through a slit of a die during extrusion molding, the kaolin particles (crystal particles) are easily oriented so that a c-axis of the particles crosses a longitudinal direction (cell axial direction) of a molded article. Moreover, in a case where the cordierite forming material including the kaolin particles is converted into cordierite by firing, the cordierite crystals grow from the kaolin particles as nuclei so as to cross the c-axis of the kaolin particles at right angles. Therefore, when the kaolin particles in the molded article are oriented as described above, the cordierite crystals in the fired honeycomb structure are oriented so that the c-axis extends in parallel with the longitudinal direction of the honeycomb structure.

The thermal expansion coefficient of the cordierite crystal in the c-axis direction is lower than that in an a-axis direction. Therefore, when most of the cordierite crystals in the honeycomb structure are oriented as described above, there is reduced the thermal expansion coefficient of the honeycomb structure in the longitudinal direction, which has a large influence on the thermal shock resistance of the honeycomb structure. As a result, there is obtained the cordierite honeycomb structure which has a low thermal expansion coefficient and an excellent resistance to thermal shock.

When the cleavage index of the kaolin particles for use is less than 0.84, a ratio of the cordierite crystals oriented as described above is small in the resultant cordierite honeycomb structure, and a sufficient effect of the low thermal expansion coefficient cannot be obtained. However, when even the kaolin particles whose cleavage index is less than 0.84 are subjected to a delamination treatment, it is possible to obtain the improved kaolin particles having a cleavage index of 0.84 or more.

Figure 3:
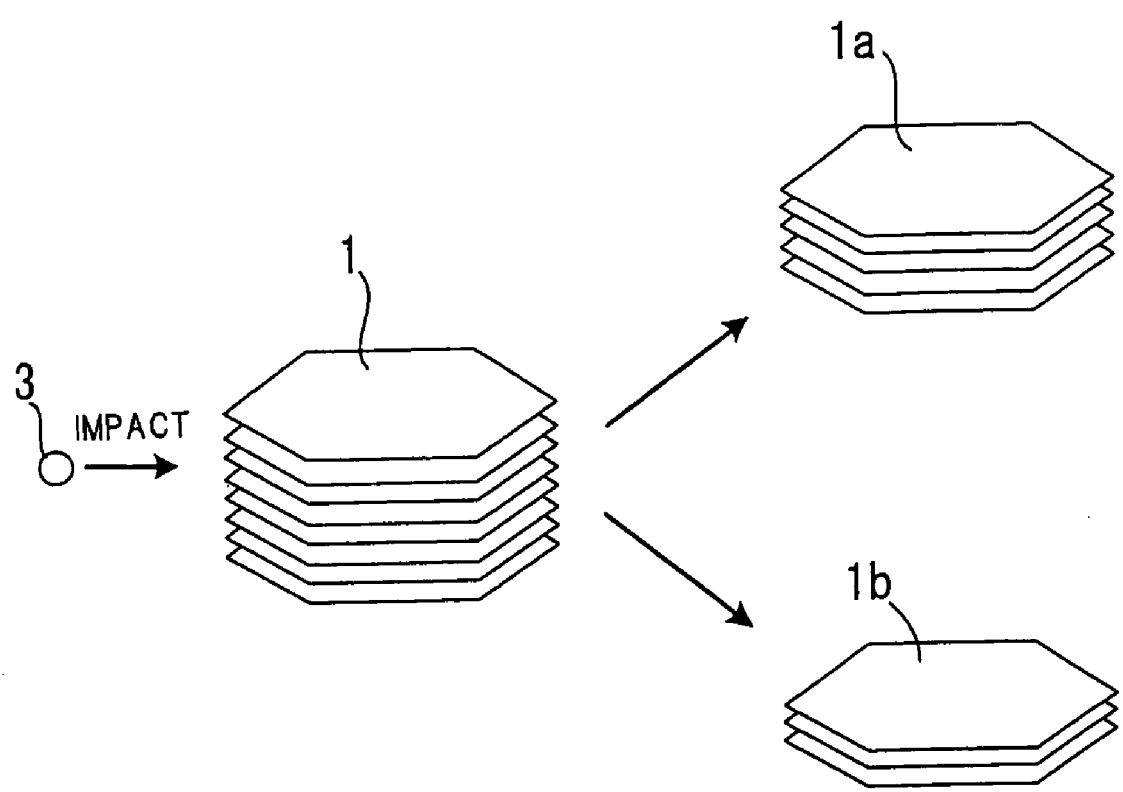
FIG. 3 is a schematic explanatory view schematically showing an interlayer peeling state of the kaolin particles in a bead mill.

The delamination treatment is a treatment to apply a physical shock to the kaolin particles and cause interlayer peeling. As a typical method, for example, the slurry kaolin particles are passed through a bead mill, a bead 3 is allowed to collide with the kaolin particles 1 to peel the particles between layers (cleaved faces) as schematically shown in FIG. 3, and the kaolin particles are split into flat kaolin particles 1a,1b having less layers. This treatment is preferably performed by appropriately controlling treatment conditions such as a flow rate so that the kaolin particles peel only between the layers, and another portion is not crushed. Even the kaolin particles whose initial cleavage index is less than 0.84 are usable in the manufacturing method of the present invention, when they are subjected to such delamination treatment so as to obtain a cleavage index of 0.84 or more.

The manufacturing method of the present invention is similar to a conventional known method of manufacturing the cordierite honeycomb structure except that the kaolin particles whose cleavage index obtained by the cleavage index measuring method is 0.84 or more are used as the kaolin particles included in the cordierite forming material. That is, particles of talc, kaolin, alumina, silica and the like are blended so that the fired composition is a cordierite theoretical composition, thereby obtaining a cordierite forming material. In addition to a solvent such as water, an organic binder such as methyl cellulose or a plasticizer is added to the material if necessary, and the material is mixed and kneaded to obtain a clay for molding. This clay is extruded from a slit of a die provided with the predetermined slit during extrusion molding to thereby mold a honeycomb-like molded article. After drying this article, the article is fired to obtain the cordierite honeycomb structure.

EXAMPLES

The present invention will be described hereinafter in more detail in accordance with examples, but the present invention is not limited to these examples.

Kaolin particles No. 1 to 12 having XRD intensities and cleavage indices calculated from intensity values by the equation (1) as shown in Table 2 were blended with talc, alumina, and silica particles so as to obtain a composition of MgO: 13.6±0.5% by mass, $Al_2O_3$: 35.7±0.5% by mass, and $SiO_2$: 50.7±0.5% by mass, and a cordierite forming material was obtained. It is to be noted that a content ratio of the kaolin particles in each cordierite forming material was set to about 7 to 22% by mass. To measure the XRD intensities of the kaolin particles, RAD-1B (trade name) manufactured by Rigaku Corp. was used as a measurement device, and the measuring was performed on the measurement conditions shown in Table 1.

These cordierite forming materials were dry-mixed, further a binder, a surfactant, and water were added to the materials, and the materials were wet-kneaded to obtain a clay to be molded. A honeycomb-shaped molded article was molded using the resultant clay by extrusion molding. After the molded article was dried, the article was worked into a predetermined dimension, and fired at a maximum temperature of 1420° C. or more to obtain a cordierite honeycomb structure (dimension: diameter of 70 mm×length of 100 mm, cell shape: square, cell density: 400 cells/inch$^2$ (about 62 cells/cm$^2$), partition wall thickness: 150 mm).

As to each of the cordierite honeycomb structures obtained in this manner, a thermal expansion coefficient, a water absorption, a pore volume, an average pore diameter, and a firing contraction were measured by the following methods, respectively. The results are shown in Table 2.

[Thermal Expansion Coefficient]

The thermal expansion coefficient of the cordierite honeycomb structure in a longitudinal direction at 40 to 800° C. was measured using TMA manufactured by Rigaku Corp.

[Water Absorption]

A dry weight and a submerged (excess water removed) weight were measured to calculate the water absorption by use of a water absorption measuring instrument manufactured by NGK Insulators, Ltd.

[Pore Volume]

The volume was measured with a mercury press-in type void measuring instrument manufactured by Micromeritic Co.

[Average Pore Diameter]

The diameter was measured with the mercury press-in type void measuring instrument manufactured by Micromeritic Co.

[Firing Contraction]

Dimensions of molded and dried articles and those of fired articles were measured with a caliper, and firing contractions were calculated.

TABLE 2

| | | XRD intensity | | | | | Various honeycomb characteristics | | | | | |
| --- | --- | --- | --- | --- | --- | --- | --- | --- | --- | --- | --- | --- |
| | No. | (001) *Reference value | (020) | (002) | (200) | (003) *Reference value | Cleavage index | Thermal expansion coefficient ($\times 10^{-6}$/° C.) | Water absorption (mass %) | Pore volume (cc/g) | Average pore diameter (μm) | Firing contraction (%) | Remark |
| Kaolin particles | 1 | 2957 | 294 | 2697 | 290 | 333 | 0.82 | 0.49 | 21.3 | 0.21 | 4.88 | 5.6 | Comparative example |
| | 2 | 4967 | 487 | 4201 | 401 | 441 | 0.83 | 0.44 | 20.1 | 0.19 | 4.63 | 5.9 | Comparative example |
| | 3 | 4276 | 146 | 3631 | 156 | 406 | 0.92 | 0.40 | 20.3 | 0.20 | 4.80 | 5.8 | Example |
| | 4 | 4787 | 119 | 4034 | 114 | 517 | 0.95 | 0.38 | 20.8 | 0.21 | 4.38 | 5.7 | Example |
| | 5 | 4773 | 121 | 4076 | 123 | 468 | 0.94 | 0.32 | 20.1 | 0.21 | 4.15 | 5.6 | Example |
| | 6 | 11482 | 173 | 9178 | 172 | 959 | 0.96 | 0.33 | 20.1 | 0.20 | 4.20 | 5.7 | Example |
| | 7 | 4522 | 262 | 4261 | 223 | 458 | 0.90 | 0.33 | 20.5 | 0.20 | 4.76 | 5.7 | Example |
| | 8 | 7018 | 241 | 5208 | 226 | 496 | 0.92 | 0.30 | 18.5 | 0.19 | 3.82 | 6.4 | Example |
| | 9 | 9521 | 142 | 7452 | 161 | 752 | 0.96 | 0.17 | 19.9 | 0.19 | 4.89 | 5.4 | Example |
| | 10 | 5712 | 154 | 4667 | 171 | 469 | 0.93 | 0.09 | 20.2 | 0.20 | 4.85 | 5.5 | Example |
| | 11 | 4071 | 358 | 3491 | 300 | 399 | 0.84 | 0.30 | 20.4 | 0.20 | 4.75 | 5.4 | Example |
| | 12 | 2318 | 164 | 2289 | 155 | 318 | 0.88 | 0.25 | 19.5 | 0.19 | 4.50 | 5.9 | Example |

As shown in Table 2, as to the cordierite honeycomb structures manufactured using the kaolin particles Nos. 1 and 2 whose cleavage index was less than 0.84 in the cordierite forming material, the thermal expansion coefficient exceeded $0.40\times10^{-6}/°$ C. On the other hand, as to the cordierite honeycomb structures manufactured using the kaolin particles Nos. 3 to 12 whose cleavage index was 0.84 or more in the cordierite forming material, the thermal expansion coefficient was suppressed to $0.40\times10^{-6}/°$ C. or less, and excellent low-thermal-expansion characteristics were exhibited.

The present invention is usable in manufacturing a cordierite honeycomb structure which is suitable for an application such as a car exhaust gas purifying catalyst carrier and which has a low thermal expansion coefficient and an excellent resistance to thermal shock.

What is claimed is:

1. A method of manufacturing a cordierite honeycomb structure whose main component of a crystal phase is cordierite by use of a cordierite forming material including kaolin particles, comprising:

determining a cleavage index of kaolin particles by the following equation (1):

[Equation 1]

$$\text{Cleavage index} = (002)/[(200)+(020)+(002)] \quad (1),$$

wherein (200), (020), and (002) denote values of peak intensities of the kaolin particles measured by X-ray diffraction in the (200), (020), and (002) faces, respectively, selecting cordierite forming material that includes kaolin particles whose cleavage index is determined to be 0.84 or more, and manufacturing the cordierite honeycomb structure with the selected cordierite forming material.

2. The method of manufacturing the cordierite honeycomb structure according to claim 1, wherein the cordierite forming material comprises the kaolin particles in an amount of about 7% to about 22% by mass.

3. The method of manufacturing the cordierite honeycomb structure according to claim 1, wherein the cordierite honeycomb structure has a coefficient of thermal expansion in a longitudinal direction of less than about $4.0\times10^{-7}/°$ C.

4. The method of manufacturing the cordierite honeycomb structure according to claim 1, wherein the method of manufacturing further comprises delaminating kaolin particles having a cleavage index of less than 0.84 to form kaolin particles having a cleavage index of greater than 0.84.

* * * * *